United States Patent [19]
Kreisler

[11] Patent Number: 6,068,168
[45] Date of Patent: May 30, 2000

[54] VEHICLE TOP CARRIER APPARATUS

[76] Inventor: Stewart Orson Kreisler, 6 Champney Pl., Boston, Mass. 02114

[21] Appl. No.: 09/136,826

[22] Filed: Aug. 20, 1998

[51] Int. Cl.[7] ......................................................... B60R 9/00
[52] U.S. Cl. ............................. 224/309; 224/310; 224/328
[58] Field of Search ..................................... 224/328, 325, 224/309, 310, 311, 314, 319, 547, 558, 401, 402, 403; 296/37.7; 403/385, 389

[56] References Cited

U.S. PATENT DOCUMENTS

| 2,119,051 | 5/1938 | Boeuf ........................................ 224/325 |
| 2,645,391 | 7/1953 | Lecanu-Deschamps ................ 224/325 |
| 2,784,888 | 3/1957 | Lecanu-Deschamps ................ 224/325 |
| 3,215,323 | 11/1965 | Bonitt ...................................... 224/325 |
| 4,299,346 | 11/1981 | Helm ........................................ 224/326 |
| 4,538,752 | 9/1985 | Welter . | 
| 4,817,897 | 4/1989 | Kreusel .................................... 248/680 |
| 5,492,259 | 2/1996 | Tippets .................................... 224/494 |
| 5,860,576 | 1/1999 | Duran ...................................... 224/326 |

OTHER PUBLICATIONS

*The Authority on Jeep, Samurai, Sidekick & Tracker,* Keystone Automotive Warehouse (1997).

Five photographs phtographed at Camp Jeep in Colorado in Aug. 1998. Differences between applicant's invention and prior art are as follows: prior art is mounted to a custom roll bar that is not available on the market. Mounting brackets are welded to the rack and receiver is welded to custom roll bar. Prior art is only functional with vehicle made in conjunction with prior art. Unlike applicant's invention, prior art is not functional with removable hard and soft top. Applicant's invention fits all model year factory installed roll bars, including those on Land Rovers and Toyota Land Cruisers. Prior art is only functional on custom roll bar installed in conjunction with prior art manufacturer. Differences between applicant's invention and prior art also include size and positioning of rack. Regarding size, prior art protrudes over the windshield of vehicle and blocks peripheral vision and diminishes purpose of convertible. Prior art also has tight mesh floor, unlike applicant's invention. Purpose of applicant's invention is to maintain feel of driving convertible. Also, subject invention does not enter peripheral vision. Additional differences between prior art and applicant's invention include applicant's invention ability to be installed and removed by one person.

*Primary Examiner*—Ruthie Layno
*Assistant Examiner*—Maerena Brevard
*Attorney, Agent, or Firm*—Fish & Richardson P.C.

[57] ABSTRACT

A vehicle rack assembly for mounting on a vehicle having a rollbar, the assembly having a unitary rack member having sidewalls and a floor and bracket members for mounting the floor of the rack to a rollbar of a vehicle. For use with a convertible SUV having a roof, the assembly can further have grommet assemblies for mounting around holes formed in a roof of a vehicle for receiving therein a portion of the bracket members, wherein a roof of a vehicle passes between a rollbar of a vehicle and said unitary rack member.

10 Claims, 3 Drawing Sheets

VEHICLE TOP CARRIER APPARATUS

BACKGROUND OF THE INVENTION

1. Field of the Invention

The present invention relates to a rack carrier for mounting atop a convertible sport utility vehicle (SUV).

2. Background

Convertible SUVs, such as Jeeps®, Land Rovers, Gazelles, and the like, offer the benefit of rugged performance for off-road use, while at the same time allowing the open-air enjoyment of a removable top. The tops can be either removable hard tops, or tops made of fabric, coated canvas, and the like.

A major disadvantage of such SUVs is their relative lack of cargo space. Any cargo that is carried must essentially be accommodated within the passenger compartment, which is limited. For situations where large items are desired to be transported, the interior cargo space of some SUVs is inadequate.

The prior art teaches various vehicle top carrier apparatus, but offers very few solutions for convertible SUVs. This is because most vehicle top racks rely on the rain gutter for mounting, or the roof of a hardtop vehicle for support. Because convertible SUVs have neither of these features, most prior art rooftop carriers are not usable with these vehicles.

One prior art rack for convertible SUVs is described in U.S. Pat. No. 4,538,752. The rack is made primarily to carry canoes. This rack attaches to the rollbar of the SUV behind the front passenger seats, and also to the windshield pivot mount on the front fenders. The fabric top is clamped between the mounting members attaching the rack to the rollbar. This rack presents many disadvantages. The rack does not allow the convenient storage of different items, because it is primarily intended to provide a plane surface upon which a canoe can be mounted. Therefore, camping gear, off-roading accessories, luggage, and smaller cannot be conveniently carried. Further, the rack cannot be easily mounted and removed. The bolting of the front member to the windshield pivot mounts is a tedious chore, and while the front member may be left on the vehicle, it is not attractive. In addition, the clamping of the fabric top between the mounting brackets does not allow for sufficient flex of the top around the rollbar, which can cause rips in the top when the vehicle chassis is subjected to torque on rough terrain. Lastly, the design of the mounting brackets relies on wing nuts to attach the rack to the bracket, the design of which is not sturdy. The use of bolts in slots to hold the rack together also inevitably leads to loosening of the apparatus and rattling during vehicle operation.

Another prior art design is that marketed by Steel Horse Automotive. This rack is mounted to the sides of the rear tailgate, and requires drilling through the body panels. Disadvantageously, the rack cannot bear a large amount of weight because the load extends rearward from the vertical mounting point, which imparts a moment about the mounting. The mounting position of the rack at the rear of the vehicle also renders access through the tailgate inconvenient, especially when the convertible top is in place. Rear visibility is also negatively impacted, concomitantly impacting vehicle safety.

SUMMARY OF THE INVENTION

The present invention provides a vehicle rack apparatus that solves the problems present in the prior art.

According to the invention a vehicle rack assembly is provided for mounting on a vehicle having a rollbar, the assembly having a unitary rack member having sidewalls and a floor and bracket members for mounting the floor of the rack to a rollbar of a vehicle. For use with a convertible SUV having a roof, the assembly can further have grommet assemblies for mounting around holes formed in a roof of a vehicle for receiving therein a portion of the bracket members, wherein a roof of a vehicle passes between a rollbar of a vehicle and said unitary rack member.

Features of the invention include a unitary, welded rack providing greater strength and eliminating rattling from bolt loosening present in the prior art.

The present invention also provides a vehicle top rack which is easily removable from and attachable to the vehicle. The invention further does not interfere with convenient removal and attachment of the convertible top of an SUV.

The present invention also provides for an attractive rack, which does not require any aesthetically undesirable supports to remain on the vehicle when the rack is not attached.

BRIEF DESCRIPTION OF THE DRAWINGS

The foregoing and other features and advantages of the present invention will be more fully understood from the following detailed description of an illustrative embodiment, taken in conjunction with the accompanying drawing in which.

DETAILED DESCRIPTION OF AN ILLUSTRATIVE EMBODIMENT

The present invention will be described herein with reference to an illustrative embodiment of a vehicle rack.

Figure 1:
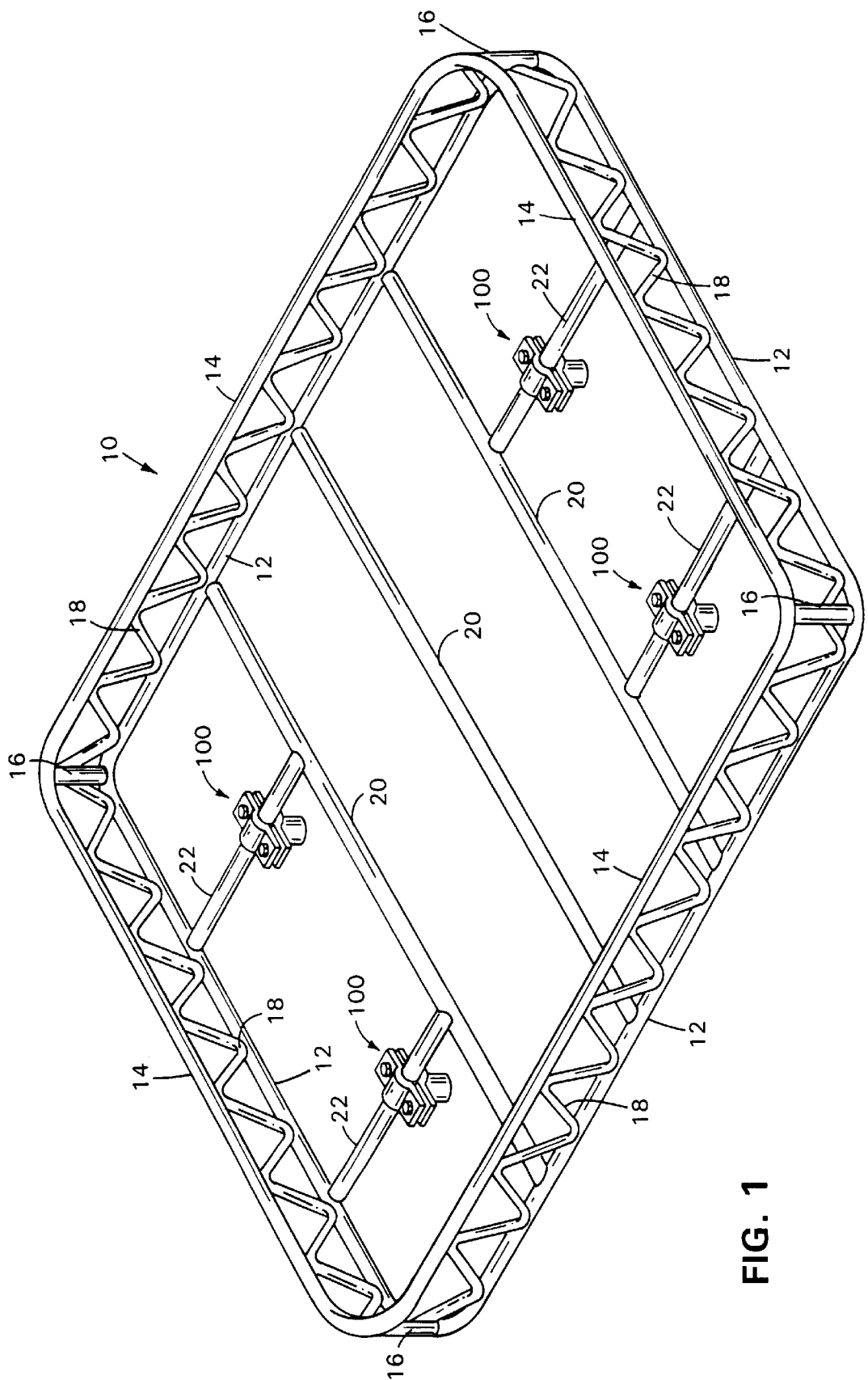
FIG. 1 is a perspective view of the rack according to an illustrative embodiment of the present invention.

Referring to FIG. 1, the rack according to an illustrative embodiment of the instant invention is depicted. The rack 10 includes a lower siderail member 12 and an upper siderail member 14. The upper siderail member 14 is mounted atop corner posts 16. A reinforcement member 18 supports the construction. The reinforcement member 18 is depicted as a continuous serpentine member on each side, but other configurations such as a lattice or series of plates or posts are also envisioned. Bottom rail members 20 span between the lower siderail members 12, and bottom crossrail members 22 span between the outermost bottom rail members 20 and an adjacent lower siderail 12. Crossrail members 22 can also be provided between the bottom rail members 20. Although two bottom crossrail members 22 are depicted, any number can be used depending on the resulting strength desired, and also depending on the size of the open area desired of the resulting grid thereby formed. Mounting brackets 100 are positioned on the crossrail members 22 as depicted, or alternatively on the lower siderail members 12 or bottom rail members 20 as necessary for the type of vehicle the rack is mounted on.

Therefore, as described above, the sidewalls of the rack are comprised of members 12, 14, 16, and 18; and the floor is comprised of members 12, 20, and 22.

The rack is preferably formed of 1½" diameter tubular metal stock, such as steel. The overall construction is preferably welded for strength. Of course, the rack may be made of a high-impact plastic, and may also be molded in part or in its entirety. Composite materials such as are known in the art may also be used. While the figures depict rounded members, other cross sectional shapes may also be used.

Figure 2:
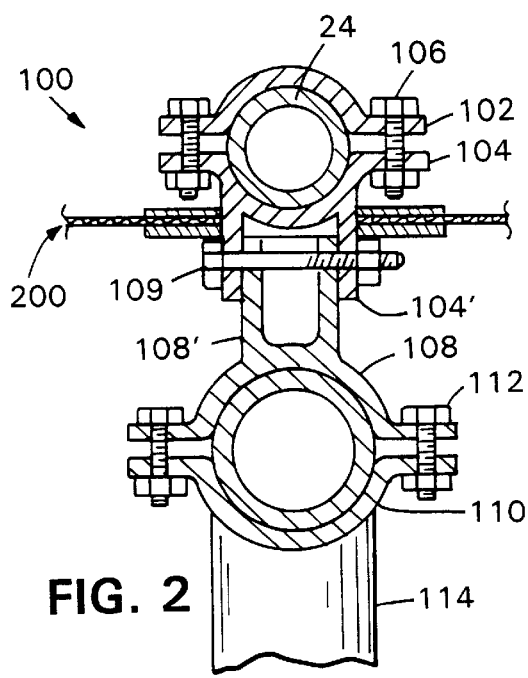
FIG. 2 is a sectional view of the mounting bracket for the rack according to an illustrative embodiment of the invention.
Figure 3:
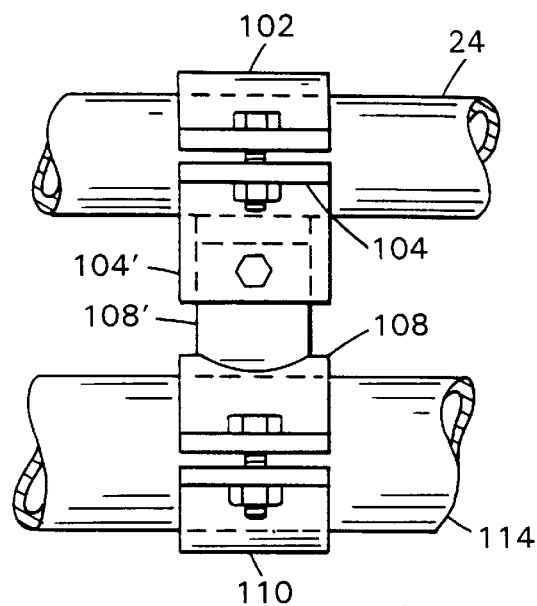
FIG. 3 is a plan view of the mounting bracket for the rack according to an illustrative embodiment of the invention.
Figure 4:
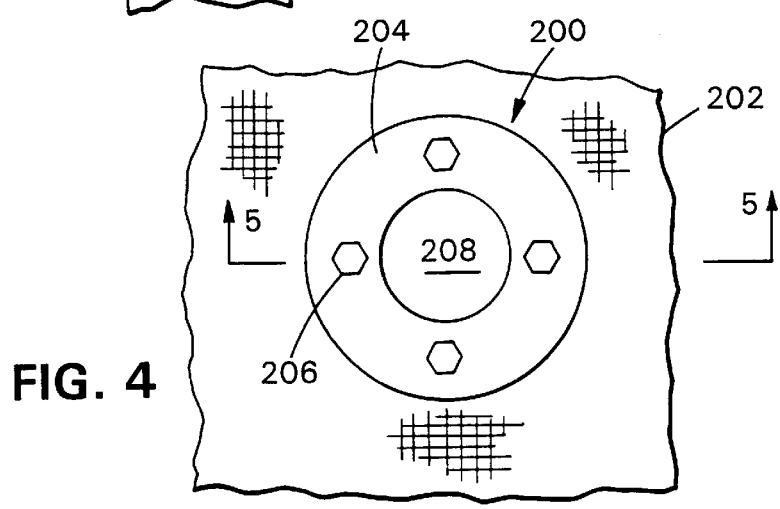
FIG. 4 is a plan view of the roof grommet according to an illustrative embodiment of the invention.

FIG. 2 depicts the mounting brackets 100 in cross section, and FIG. 3 depicts the mounting brackets 100 in plan view. Member 24 as depicted is one of the crossrail members 22, the lower siderail members 12 or bottom rail members 20 as necessary for the type of vehicle the rack is mounted on. Upper rack clamp member 102 and lower rack clamp member 104 are sized to securely clamp the member 24 securely, and are preferably provided with flanges as depicted. An attachment member 106, such as a carriage or hex bolt, are provided to clamp the upper and lower clamp members 102, 104 to the rack member 24. Where rounded stock is used for the rack members, one or both of the clamp members 102, 104 may be grooved, scored, or fabricated with gripping teeth or ridges to aid in holding the rack member 24. Alternatively, the interface between the clamp members 102, 104 and the rack member 24 may be provided with rubber or other high-friction material.

The lower rack clamp member 104 has a downward tubular extension 104' which mates with an upward tubular extension 108' of upper rollbar clamp member 108. Preferably, the inside diameter of the downward tubular extension 104' is about 1½", which is the same as the outer diameter of the upward tubular extension 108'. In this manner, the extensions 104' and 108' are telescopically engageable. A pin 109, such as a carriage bolt, hex bolt, or the like, holds the tubular extensions 104', 108' together.

The upper rollbar clamp member 108 is attached to the lower rollbar clamp member 110. Upper rollbar clamp member 108 and lower rollbar clamp member 110 are sized to securely clamp the rollbar 114 securely, and are preferably provided with flanges as depicted. Attachment members 112, such as a carriage or hex bolt, are provided to clamp the upper and lower clamp members 108, 110 to the rollbar 114. Where rounded stock is used for the rollbar as is typical, one or both of the clamp members 108, 110 may be grooved, scored, or fabricated with gripping teeth or ridges to aid in holding the rollbar 114. Alternatively, the interface between the clamp members 108, 110 and the rollbar 114 may be provided with rubber or other high-friction material.

Figure 5:
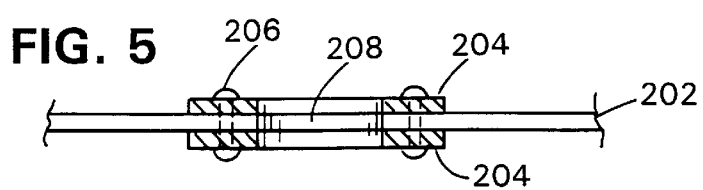
FIG. 5 is a sectional view of the roof grommet according to an illustrative embodiment of the invention.

As shown in FIG. 2, a roof grommet assembly 200 is provided for allowing the mounting brackets 100 to pass through the roof of the vehicle. The grommet assembly 200 is depicted in FIG. 5 in greater detail. The roof 202 of the vehicle may be either a soft fabric top, or a hard top, such are known in the SUV market. A pair of annular plates 204 are mounted on either surface of the top, and are secured by attachment members 206, which are preferably rivets, but can be bolts or other attachment members known in the art. The holes 208 in the center of the annular plates 204 correspond to a hole in the roof 202 of the vehicle. Preferably, a rubber seal is mounted between the plates 204 and the roof 202, and may extend slightly into the hole 208. As shown in FIG. 2, the downwardly descending tubular extension 104' is received within the hole 208 of the grommet assembly 200. The tubular extension 104' should be sized such that the riding height of the grommet assembly 200 allows for adequate access to the attachment member 109 from inside the vehicle.

The grommet assembly 200 is depicted as accommodating the tubular extension 104', such that when the rack is removed by removing attachment member 109 and lifting the rack, and rack clamp members 102, 104 from the vehicle, the grommet assembly hole 208 can be plugged in known fashion such that the plug can be advantageously received in the upward extension 108'. Of course, the grommet assembly can also be configured such that hole 208 receives the upward tubular extension 108' of the rollbar clamp member 108. In this instance, when the rack is removed, the extension 108' will extend above the roof 202, and can be plugged in the known manner. This latter configuration is less aesthetically desirable, but may be preferable to some users.

Figure 6A:
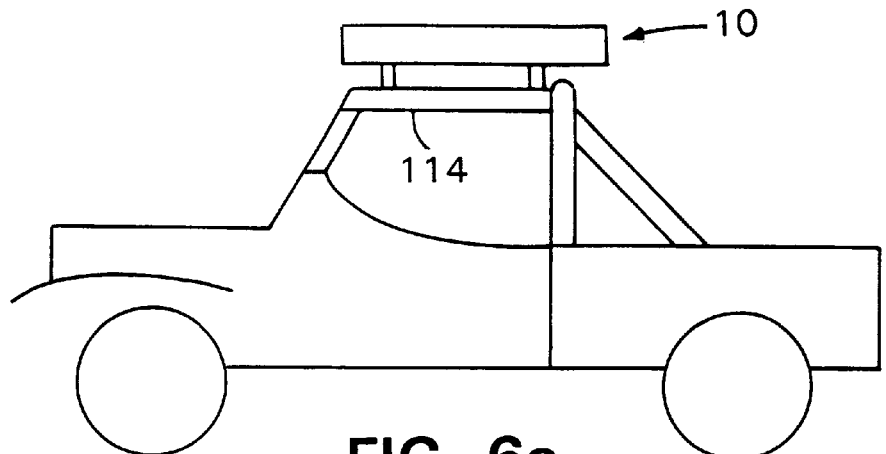
FIG. 6*a* is a diagrammatic view of the rack attached to an SUV having a first configuration.
Figure 6B:
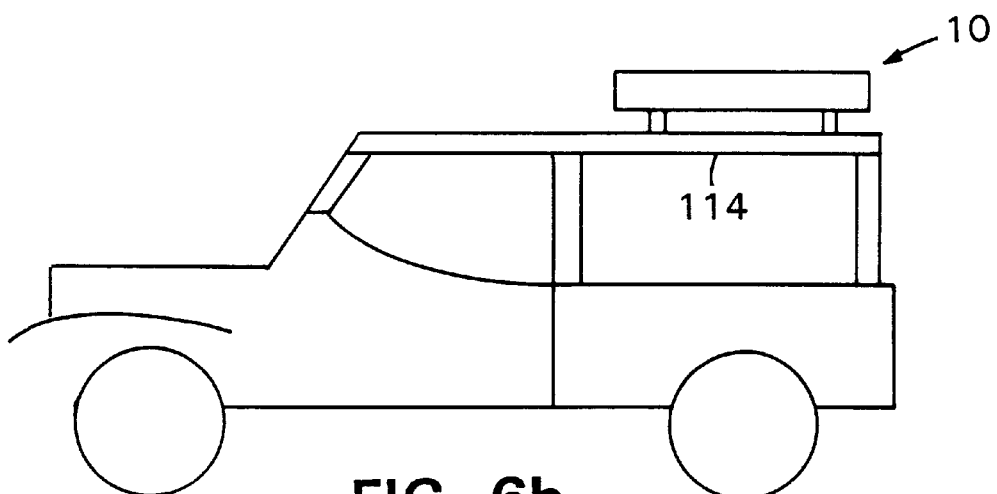
FIG. 6*b* is a diagrammatic view of the rack attached to an SUV having a second configuration.
Figure 6C:
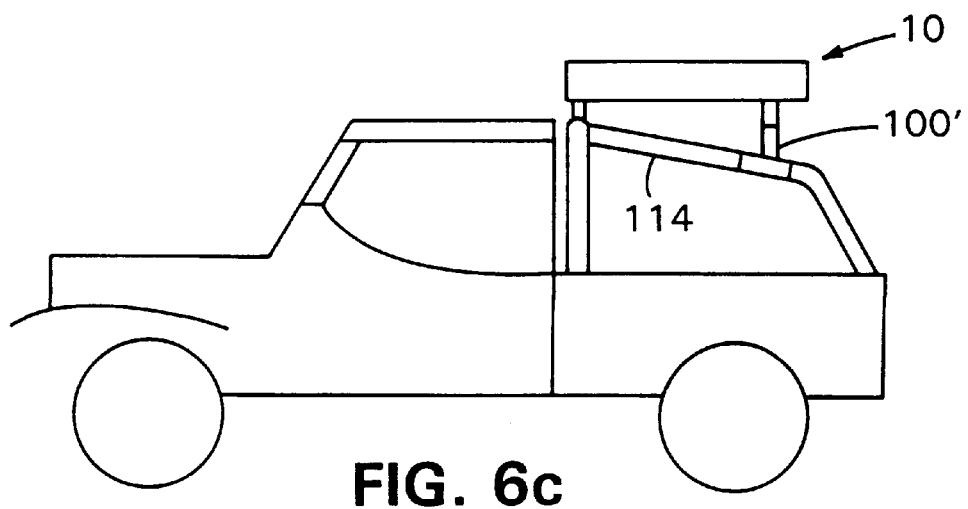
FIG. 6*c* is a diagrammatic view of the rack attached to an SUV having a third configuration.

FIGS. 6a through 6c depict the rack 10 mounted on various vehicle configurations. FIG. 6a depicts the rack on a vehicle having a forward over-cab rollbar, such as are common in Jeep® CJ model SUVs. FIG. 6b depicts the rack mounted on a vehicle having parallel horizontal rear rollbar members, such as are common on 1997 model year and later Jeep® Wrangler models. FIG. 6c depicts the rack mounted on SUV's having rear rollbar members which are at an angle to the horizontal, such as are common in Jeep® Wrangler models made prior to the 1997 model year. In such cases, mounting bracket 100' can be formed with the upward extending tubular extension 108' formed at an angle to the upper rollbar clamp member 108. Of course, other vehicle configurations may require additional modifications.

Although the invention has been shown and described with respect to exemplary embodiments thereof, various other changes, additions and omissions in the form and detail thereof may be made therein without departing from the spirit and scope of the invention.

What is claimed is:

1. A vehicle rack assembly for mounting on a vehicle having a rollbar, the assembly comprising:

a unitary rack member having sidewalls and a floor;

bracket members for removably mounting said rack directly upon the rollbar of the vehicle; and grommet assemblies for mounting upon the roof of the vehicle around holes formed therein for receiving therethrough, in water-tight relationship, a portion of said bracket members, wherein the roof of the vehicle passes between the rollbar of the vehicle and said unitary rack member;

wherein said bracket members further comprise upper and lower rack clams members, said lower rack clamp members comprising downward tubular extensions, and upper and lower rollbar clamp members, said upper rollbar clamp members comprising upward tubular extensions, wherein said downward tubular extensions and said upward tubular extensions are cooperatively engageable.

2. A vehicle rack assembly for mounting on a vehicle having a rollbar and a roof, said assembly comprising:

a unitary rack member having sidewalls and a floor;

bracket members for removably mounting said rack directly upon the rollbar of the vehicle; and grommet assemblies for mounting upon the roof of the vehicle around holes formed therein for receiving therethrough, in water-tight relationship, a portion of said bracket members, wherein the roof of the vehicle passes between the rollbar of the vehicle and said unitary rack member.

3. The vehicle rack assembly of claim 2, wherein said sidewalls of the unitary rack member further comprise lower and upper side rail members, reinforcement members between said lower and upper side rail members, and corner posts; and said floor of said unitary rack member further comprise said lower side rail members, bottom rail members and cross rail members.

4. The vehicle rack assembly of claim 2, wherein said bracket members further comprise:

upper and lower rack clamp members, said lower rack clamp members comprising downward tubular extensions; and upper and lower rollbar clamp members, said upper rollbar clamp members comprising upward tubular extensions;

wherein said downward tubular extensions and said upper tubular extensions are cooperatively engageable.

5. The vehicle rack assembly of claim 1, wherein said sidewalls of the unitary rack member further comprise lower and upper side rail members, reinforcement members between said lower and upper side rail members, and corner posts; and said floor of said unitary rack member further comprises said lower side rail members, bottom rail members and cross rail members.

6. A vehicle with a rollbar and a vehicle rack assembly removably mounting upon said rollbar, said vehicle rack assembly comprising:

a unitary rack member having sidewalls and a floor;

bracket members for removably mounting said rack directly upon the rollbar of the vehicles; and grommet assemblies for mounting upon the roof of the vehicle around holes formed therein for receiving therethrough, in water-tight relationship, a portion of said bracket members, wherein the roof of the vehicle passes between the rollbar of the vehicle and said unitary rack member.

7. The vehicle and rack assembly of claim 6, wherein said bracket members further comprise:

upper and lower rack clamp members, said lower rack clamp members comprising downward tubular extensions; and upper and lower rollbar clamp members, said upper rollbar clamp members comprising upward tubular extensions;

wherein said downward tubular extensions and said upward tubular extensions are cooperatively engageable.

8. The vehicle having a rollbar and a rack assembly removably mounted upon said rollbar of claim 6, wherein said sidewalls of said unitary rack member further comprise lower and upper side rail members, reinforcement members between said lower and upper side rail members, and corner posts; and said floor of said unitary rack member further comprises said lower side rail members, bottom rail members and cross rail members.

9. The vehicle and rack assembly of claim 8, wherein said bracket members further comprise:

upper and lower rack clamp members, said lower rack clamp members comprising downward tubular extensions; and upper and lower rollbar clamp members, said upper rollbar clamp members comprising upward tubular extensions;

wherein said downward tubular extensions and said upward tubular extensions are cooperatively engageable.

10. The vehicle having a rollbar and a rack assembly removably mounted upon said rollbar of claim 7, wherein said sidewalls of said unitary rack member further comprise lower and upper side rail members, reinforcement members between said lower and upper side rail members, and corner posts; and said floor of said unitary rack member further comprises said lower side rail members, bottom rail members and cross rail members.

* * * * *